US009977707B1

(12) United States Patent
Nagabushanam

(10) Patent No.: US 9,977,707 B1
(45) Date of Patent: May 22, 2018

(54) METHOD AND FAULT DETECTION DEVICE FOR AUTOMATIC FAULT DETECTION AND ANALYSIS IN VIDEO CONFERENCING SYSTEMS

(71) Applicant: Wipro Limited, Bangalore (IN)

(72) Inventor: Sudhakar Getamaneni Nagabushanam, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days. days.

(21) Appl. No.: 15/474,087

(22) Filed: Mar. 30, 2017

(51) Int. Cl.
*H04N 7/15* (2006.01)
*G06F 11/07* (2006.01)
*G06N 99/00* (2010.01)
*G06N 5/04* (2006.01)

(52) U.S. Cl.
CPC ........ *G06F 11/079* (2013.01); *G06F 11/0736* (2013.01); *G06F 11/0751* (2013.01); *G06F 11/0787* (2013.01); *G06N 5/046* (2013.01); *G06N 99/005* (2013.01); *H04N 7/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,463,768 A | * | 10/1995 | Cuddihy | G06F 11/2205 714/37 |
| 2012/0151266 A1 | | 6/2012 | Reed et al. | |
| 2015/0094959 A1 | | 4/2015 | Ning et al. | |
| 2015/0142702 A1 | * | 5/2015 | Nilsson | G06N 5/048 706/11 |
| 2015/0347265 A1 | * | 12/2015 | Clements | G06F 11/3476 714/45 |

FOREIGN PATENT DOCUMENTS

WO  2014043623 A1  3/2014

OTHER PUBLICATIONS

"Monitoring Video Conferencing Solutions", www.sciencelogic.com, 2014.
"RVMon, Real-Time Monitoring", www.spirent.com/Products/DevTools/voice-video-monitoring/RVmon, Mar. 30, 2017.
"Cisco Prime Collaboration", www.cisco.com, Mar. 30, 2017.

* cited by examiner

*Primary Examiner* — Joseph J Nguyen
*Assistant Examiner* — Phung-Hoang J Nguyen
(74) *Attorney, Agent, or Firm* — LeClairRyan PLLC

(57) ABSTRACT

This disclosure relates to a method and device for detecting and analyzing faults in video conferencing systems. The method includes extracting a diagnostic log that includes unstructured textual information for at least one video conference session from a video conferencing system. The method further includes converting the diagnostic log into a uniform time zone diagnostic log that includes structured textual information. The method includes collecting Quality of Service (QoS) metrics associated with the at least one video conference session and event parameters associated with at least one live event within the at least one video conference session. The method includes processing the uniform time zone diagnostic log, the QoS metrics, and the event parameters based on at least one of a plurality of analytics rules stored in an analytics rule database. The method further includes performing at least one predefined action based on a result of the processing.

17 Claims, 5 Drawing Sheets

METHOD AND FAULT DETECTION DEVICE FOR AUTOMATIC FAULT DETECTION AND ANALYSIS IN VIDEO CONFERENCING SYSTEMS

TECHNICAL FIELD

This disclosure relates generally to video conferencing and more particularly to a method and fault detection device for automatic fault detection and analysis in video conferencing systems.

BACKGROUND

In an ever connected world today and increasing travel costs, video conferencing, owing to its ease of operation, has become one important mode of live communication within and amongst organizations. Video conferencing systems, however, face frequent faults and issues because of multifarious reasons. Such systems are not equipped to accurately detect the faults in real time and subsequently resolve it.

Some conventional systems monitor availability and performance of video infrastructure, video endpoints, and underlying Information Technology (IT) infrastructure, based on system generated events, including call control events (for example, connect disconnect, network related events packet loss, or jitters, and the like). However, such conventional systems may miss faults that are not likely to generate any events, but may cause issues at level of the participants (on corresponding communication devices). By way of an example, video decoding errors on participants' communication devices may never get noted as system level events, however, the participants may observe video blackouts.

Some other conventional systems, which detect faults within log files, parse machine event logs to extract data related to errors and events, in order to detect faults or failures. However, these conventional systems have a drawback that they may detect an issue late or may completely miss detecting the issue in the machine event logs.

SUMMARY

In one embodiment, a method for detecting and analyzing faults in video conferencing systems is disclosed. The method includes extracting, by a fault detection device, a diagnostic log for at least one video conference session from a video conferencing system, wherein the diagnostic log includes unstructured textual information; converting, by the fault detection device, the diagnostic log into a uniform time zone diagnostic log including structured textual information; collecting, by the fault detection device, Quality of Service (QoS) metrics associated with the at least one video conference session and event parameters associated with at least one live event within the at least one video conference session; processing, by the fault detection device, the uniform time zone diagnostic log, the QoS metrics, and the event parameters based on at least one of a plurality of analytics rules stored in an analytics rule database; and performing, by the fault detection device, at least one predefined action based on a result of the processing.

In another embodiment, a fault detection device for detecting and analyzing faults in video conferencing systems is disclosed. The fault detection device includes a processor; and a memory communicatively coupled to the processor, wherein the memory stores processor instructions, which, on execution, causes the processor to extract a diagnostic log for at least one video conference session from a video conferencing system, wherein the diagnostic log includes unstructured textual information; convert the diagnostic log into a uniform time zone diagnostic log including structured textual information; collecting, by the fault detection device, QoS metrics associated with the at least one video conference session and event parameters associated with at least one live event within the at least one video conference session; process the uniform time zone diagnostic log, the QoS metrics, and the event parameters based on at least one of a plurality of analytics rules stored in an analytics rule database; and perform at least one predefined action based on a result of the processing.

In yet another embodiment, a non-transitory computer-readable storage medium is disclosed. The non-transitory computer-readable storage medium has instructions stored thereon, a set of computer-executable instructions causing a computer including one or more processors to perform steps including extracting, by a fault detection device, a diagnostic log for at least one video conference session from a video conferencing system, wherein the diagnostic log includes unstructured textual information; converting, by the fault detection device, the diagnostic log into a uniform time zone diagnostic log including structured textual information; collecting, by the fault detection device, QoS metrics associated with the at least one video conference session and event parameters associated with at least one live event within the at least one video conference session; processing, by the fault detection device, the uniform time zone diagnostic log, the QoS metrics, and the event parameters based on at least one of a plurality of analytics rules stored in an analytics rule database; and performing, by the fault detection device, at least one predefined action based on a result of the processing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
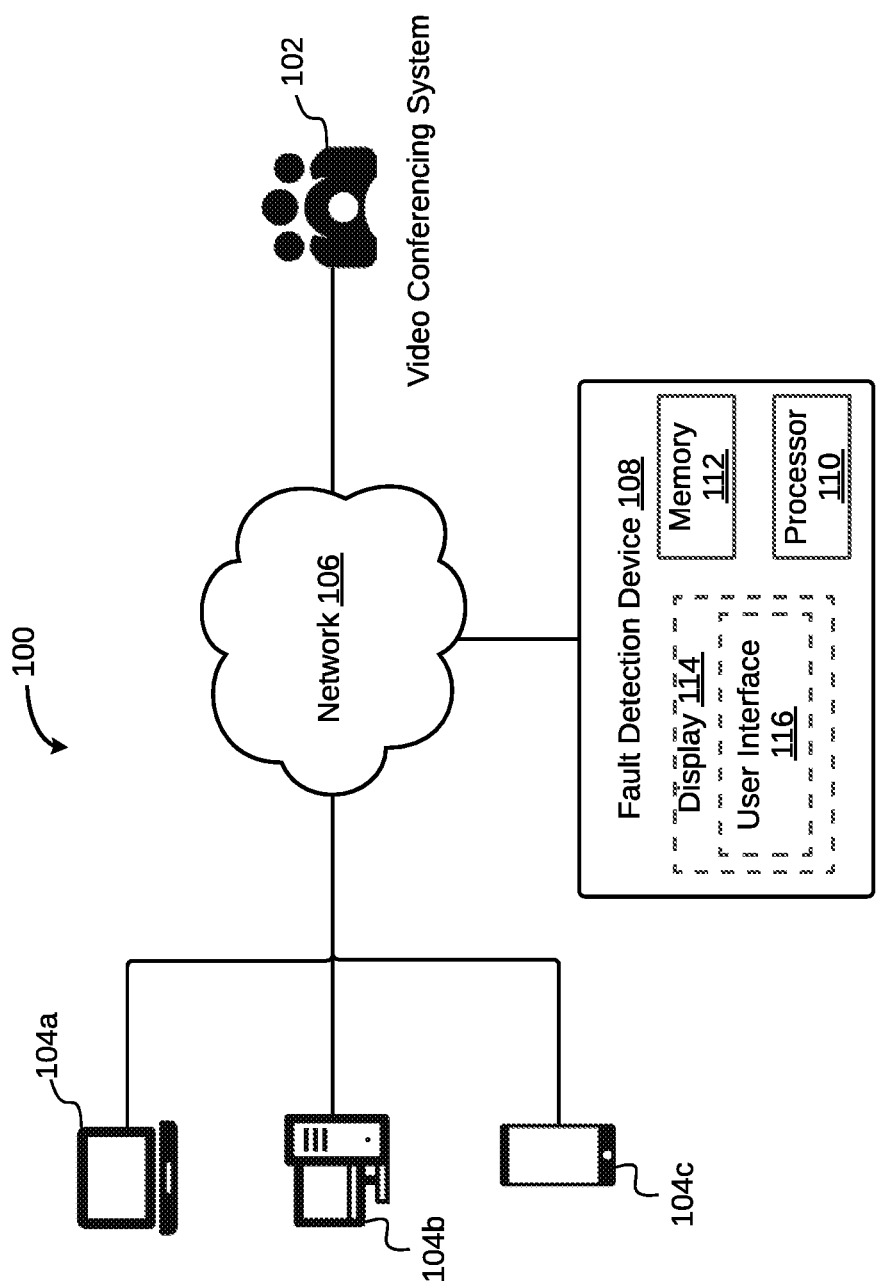
FIG. 1 illustrates a system for detecting and analyzing faults in a video conferencing system, in accordance with an embodiment.

Additional illustrative embodiments are listed below. In one embodiment, a system 100 for detecting and analyzing faults in a video conferencing system 102 is illustrated in FIG. 1. System 100 includes a laptop 104a, a desktop 104b, and a smart phone 104c (collectively referred to as a plurality of communication devices 104), which access video conferencing system 102 via a network 106. Plurality of communication devices 104 may also include, for example, a tablet, a phablet, a mobile phone or any video conferencing end-device that can support audio and video communication (not shown in FIG. 1). Video conferencing system 102 may be any conventional video conferencing system (hardware or software or a combination thereof) that facilitates audio and video communication amongst multiple participants at a given time. Network 106 may be a wireless or a wireline network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Participants may use plurality of communication devices 104 to participate in a video conference session facilitated by video conferencing system 102. To begin the video conference session, the participants may initially be required to provide respective login credentials and access codes. Once the participants have logged into video conferencing system 102, the video conference session is initiated.

During the video conference session, in order to detect faults or issues that may occur within video conference system 102, in network 106, or at one or more of plurality of communication devices 104, a fault detection device 108 is communicatively coupled to network 106. Fault detection device 108 may alternatively be directly coupled to video conference system 102. Fault detection device 108 resolves these faults or issues in order to ensure uninterrupted and error free video conference sessions.

To this end, fault detection device 108 includes a processor 110 and a memory 112 that stores processor instructions, which, on execution, causes the processor to detect and resolve faults or issues occurring during the video conference session. Memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

Figure 2:
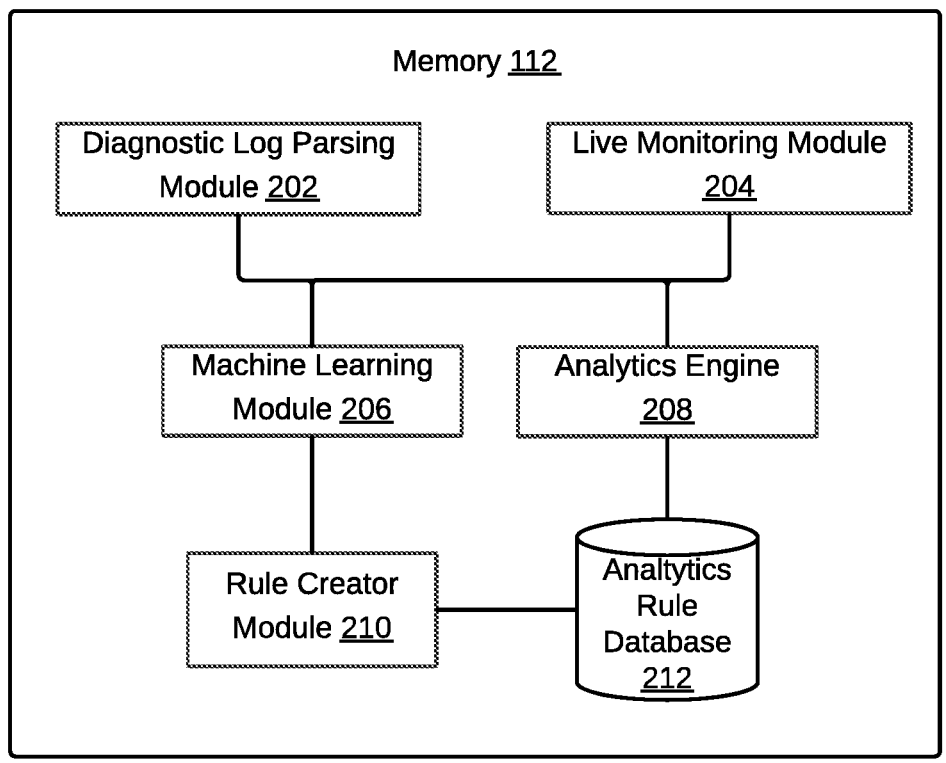
FIG. 2 is a block diagram illustrating various modules in a memory of a fault detection device configured to detect and analyze faults in a video conferencing system, in accordance with an embodiment.

Memory 112 further includes various modules, which have been explained in detail in conjunction with FIG. 2. Fault detection device 108 may further include a display 114 having a User Interface (UI) 116 that may be used by an administrator to provide inputs and to interact with fault detection device 108. Display 114 may further be used to display reports and results of various analysis (as discussed further in greater detail) performed by fault detection device 108.

Referring now to FIG. 2, a block diagram of various modules stored in memory 112 of fault detection device 108 configured to detect and analyze faults in video conferencing system 102 is illustrated, in accordance with an embodiment. Memory 112 includes a diagnostic log parsing module 202, a live monitoring module 204, a machine learning module 206, an analytics engine 208, and a rule creator module 210. Once one or more video conference sessions are initiated via video conferencing system 102, diagnostic log parsing module 202 extracts a diagnostic log (also referred to as debug log) for the one or more video conference sessions from video conferencing system 102. As the information in the diagnostic log is unstructured textual information, diagnostic log parsing module 202 converts the diagnostic log into a uniform time zone diagnostic log that includes structured textual information. This is done to standardize information in the diagnostic log to enable a more accurate analysis. This is further explained in detail in conjunction with FIG. 3.

Thereafter, while the one or more video conference sessions are ongoing, live monitoring module 204 collects Quality of Service (QoS) metrics associated with the one or more video conference sessions. The QoS metrics includes one or more of a video QoS, an audio QoS, or a network QoS. Live monitoring module 204 additionally collects event parameters associated with one or more live events within the video conference sessions. The one or more event parameters include one or more of screen co-ordinates of a video freeze, a duration of the video freeze, a duration of an audio freeze, a duration of video quality deterioration, and a duration of audio quality deterioration. Live monitoring module 204 also keeps a record of all live events detected during continuance of the one or more video conference sessions.

Analytics engine 208 then processes the uniform time zone diagnostic log, the QoS metrics, and the event parameters based on one or more of a plurality of analytics rules stored in an analytics rule database 212. The plurality of analytics rules in analytics rule database 212 are derived based on analysis of one or more historical video conference sessions. The plurality of analytics rules determines an action that should be taken, when a fault or issue is detected during a video conference session. Using analytics rule database 212, analytics engine 208 determines the analytics rules that would be applicable in a given scenario. This is further explained in detail in conjunction with FIG. 3.

Based on a result of the processing, analytics engine 208 determines one or more predefined actions that need to be performed. The predefined actions are further explained in detail in conjunction with FIG. 3. Thereafter, machine learning module 206 performs machine learning techniques on the uniform time zone diagnostic log, the QoS metrics, and the event parameters for incremental learning and training. Based on the learnings derived by the machine learning techniques, rule creator engine 210 creates new analytics rule and updates analytics rule database 212. This is further explained in detail in conjunction with FIG. 4.

Figure 3:
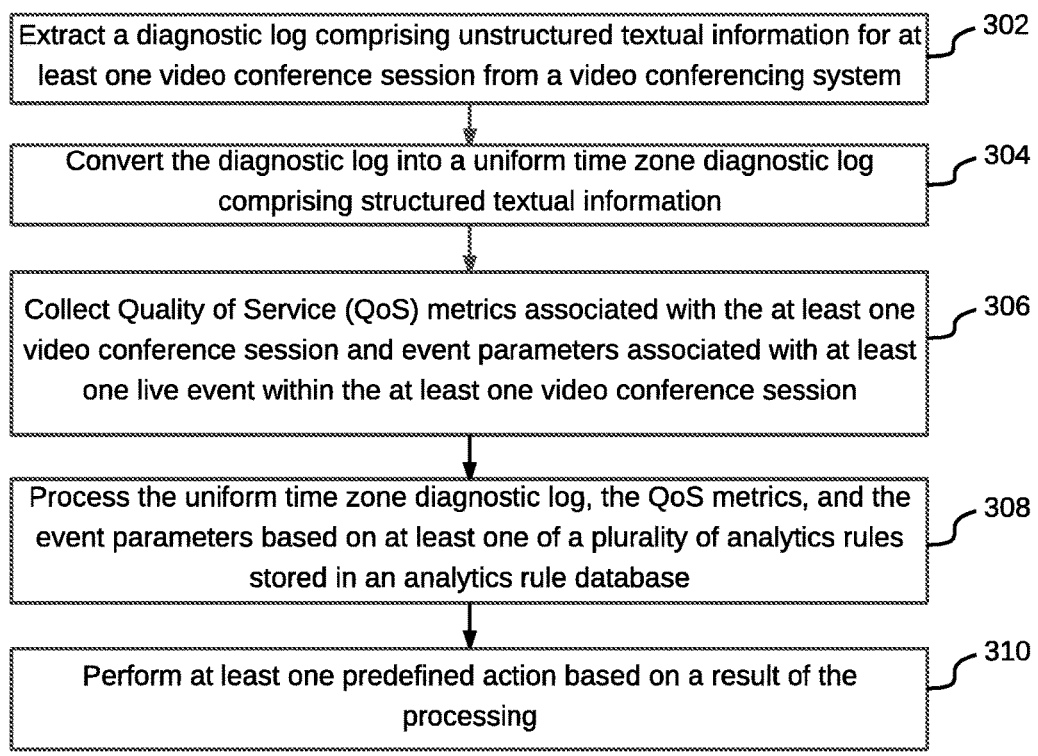
FIG. 3 illustrates a flowchart of a method for detecting and analyzing faults in a video conferencing system, in accordance with an embodiment.

Referring now to FIG. 3, a flowchart of a method for detecting and analyzing faults in video conferencing system 102 is illustrated, in accordance in an embodiment. Fault detection device 108 creates analytics rule database 212 that includes a plurality of analytics rules derived based on analysis of one or more historical video conference sessions. The plurality of analytics rules determines an action that fault detection device 108 should take when it detects a fault or issue during a video conference session. The action may include, but is not limited to, generating an alert/warning or sending a notification to one or more participants on respective communication devices. By way of an example, analytics rules define actions to be taken when one or more of the following are detected: known signatures of error messages, particular patterns of multiple such signatures, or correlation between such signatures, the patterns, and associated time stamps. When video conferencing system 102 is being initiated for the first time, analytics rule database 212 may either be empty or may include analytics rules that have been manually updated by an administrator.

Once one or more video conference sessions are initiated, fault detection device 108 extracts a diagnostic log (also referred to as debug log) for the one or more video conference sessions from video conferencing system 102, at step 302. The diagnostic log includes unstructured textual information. The diagnostic log includes error messages that may manifest at programming or system level but not yet on the participant level. As the information in the diagnostic log is unstructured, at step 304, fault detection device 108 converts the diagnostic log into a uniform time zone diagnostic log that includes structured textual information. Fault detection device 108 first parses the unstructured text in the diagnostic log into a uniform structured format having a plurality of fields, which may include, but is not limited to severity classification of error messages, time stamp of each error message, or actual verbose description of an error message or an event. The uniform structured format is further converted into the uniform time zone diagnostic log based on one or more of logging time of each participant, time zone of video conferencing system 102, time zone associated with each participant, or applicable daylight savings. This is done to standardize information in the diagnostic log across different time zones in order to enable a more accurate analysis. The structured information in the uniform time zone diagnostic log is indexed to facilitate fault detection device 108 to perform further analysis and derive relevant insights.

Thereafter, while the one or more video conference sessions are ongoing, fault detection device 108, at step 306, collects QoS metrics associated with the one or more video conference sessions. The QoS metrics includes one or more of a video QoS, an audio QoS, or a network QoS. The video QoS includes one or more of frame rates, video freeze, or video blackouts. The audio QoS includes one or more of audio bitrate, audio artifacts, or silence detections and the network QoS includes one or more of network bandwidth, packet latency, or packet loss.

Fault detection device 108 additionally collects event parameters associated with one or more live events within these video conference sessions at step 306. The one or more event parameters include one or more of screen co-ordinates of a video freeze, a duration of a video freeze, a duration of an audio freeze, a duration of video quality deterioration, and a duration of audio quality deterioration. Fault detection device 108 also keeps a record of all live events detected during continuance of the one or more video conference sessions. Examples of these live events may include, but are not limited to the video conference session currently active, joining and leaving messages for the participant, or video transitions for active speaker(s).

In order to collect the above mentioned data without affecting the video conferencing experience and without adding additional processing load, fault detection device 108 connects as a receive only participant. In other words, neither the participant, via respective communication devices, nor video conferencing system 102 would detect any activity associated with fault detection device 108.

At step 308, fault detection device 108 processes the uniform time zone diagnostic log, the QoS metrics, and the event parameters based on one or more of the plurality of analytics rules stored in analytics rule database 212. Fault detection device 108 identifies analytics rules that would be applicable in a given scenario. In an embodiment, analytics rule database 212 may include specific fields for parameters associated with each of the uniform time zone diagnostic log, the QoS metrics, and the event parameters. Thus, fault detection device 108 parses these specific fields in analytics rule database 212 in order to identify one or more applicable analytics rules. By way of an example, analytics rule database 212 that includes the above discussed fields is depicted in table 1:

TABLE 1

| Diagnostic log parameters | QoS metrics parameters | Event parameters | Applicable Analytics Rule (s) |
|---|---|---|---|
| 1. Time stamps in UTC<br>2. Type of log - Error, Warning, Information,<br>3. Module Name - Call Control, Video module, Audio Module, Content sharing, SIP protocol, Conference Control<br>4. Verbose description of message -Bitrate is reduced, Participant #1 added. | 1. Video QOS: video frame rates, bitrates, resolution, video freeze, video blackouts, video sharpness, video Jerkiness.<br>2. Audio QOS: Silent Audio, Choppy Audio, Audio sampling rate, bitrate, Audio codec changes.<br>3. Network QOS: Network Packet latency, Packet Loss, Network jitter, Network Bandwidth. | 1. Conference Event- Begin, start etc.<br>2. Participant Event- Added, Removed, timeout.<br>3. Call Events - Dropped, Redialing<br>4. Content Sharing Event - Content sharing enabled, Disabled, Content floor (presenter) changes<br>5. Bandwidth - Conference Bandwidth increase, decrease<br>6. Speaker transition: Speaker #1 is active speaker, Active speaker queue [based on activity]<br>7. Video conference layout changes | 1. QOS parameters or events Related. By way of an example, Call drops > predefined threshold. By way of another example, bandwidth changes not within certain % of initial bandwidth<br>2. Predefined sequence of events - Conference begin, participant added, active speaker switching, content enabled, content disabled, participant removed, conference ended = THIS IS NORMAL.<br>Any unexpected events like participant timeout, too many video QOS changes etc = THIS IS NOT NORMAL |

Accordingly, at step 310, fault detection device 108 performs one or more predefined actions based on a result of the processing. A predefined action may be generating Key Performance Indicators (KPIs) associated with the one or more video conference sessions. The KPIs are indicative of critical health metrics for a given video conference session. Examples of the KPIs may include, but are not limited to up-time, duration of videos within the video conference session, and total video viewing time for each participant. The predefined action may also include generating an alert/warning or sending a notification. By way of an example, fault detection device 108 may generate an alert/warning that may be flashed on one or more of plurality of communication devices 104. Fault detection device 108 may send a notification by way of a message, for example, an email or a Short Messaging Service (SMS), indicating the issue and a corrective action to resolve the issue. The predefined action may also include generating a summary report for the one or more video conference sessions. The summary report may be presented by fault detection device 108 in the form of a dashboard. In this case, a user may also interact with the dashboard to customize the content of the summary report, based on his/her requirement. Some additional examples of predefined actions are illustrated in table 1 given above.

Figure 4:
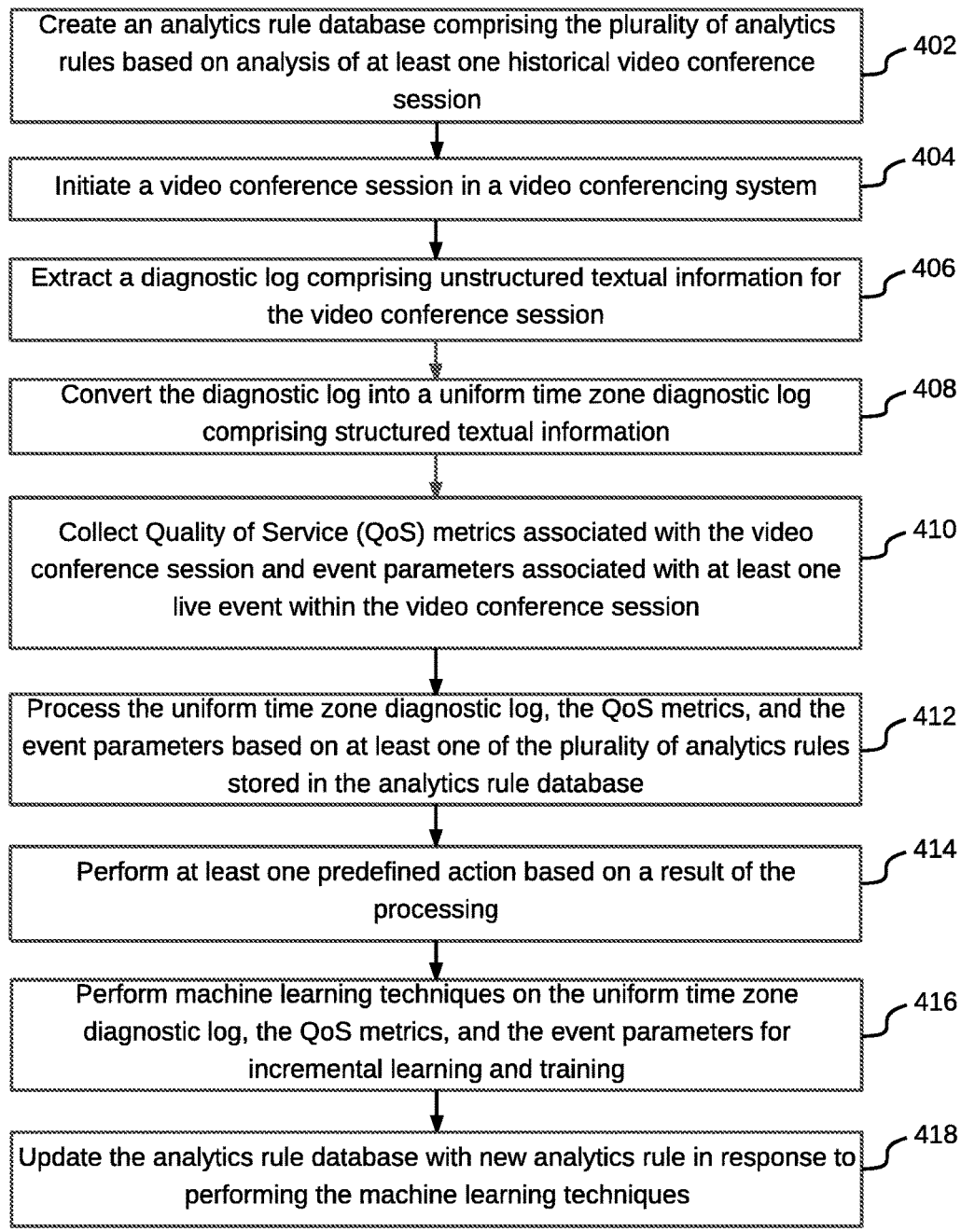
FIG. 4 illustrates a flowchart of a method for detecting and analyzing faults in a video conferencing system, in accordance with another embodiment.

Referring now to FIG. 4, a flowchart of a method of detecting and analyzing faults in video conferencing system 102 is illustrated, in accordance with another embodiment. At step 402, fault detection device 108 creates analytics rule database 212 that includes a plurality of analytics rules based on analysis of one or more historical video conference sessions. At step 404, a video conference session is initiated in video conferencing system 102. The video conference session may include a plurality of participants. This has already been explained in detail in conjunction with FIG. 3.

Once the video conference session has initiated, fault detection device 108 extract a diagnostic log for the video conference session that includes unstructured textual information, at step 406. Thereafter, at step 408, fault detection device 108 converts the diagnostic log into a uniform time zone diagnostic log that includes structured textual information. At step 410, fault detection device 108 collect QoS metrics associated with the video conference session and event parameters associated with one or more live events within the video conference session. At step 412, fault detection device 108 processes the uniform time zone diagnostic log, the QoS metrics, and the event parameters based on one or more of the plurality of analytics rules. Accordingly, at step 414, fault detection device 108 performs one or more predefined actions based on a result of the processing. This has already been explained in detail in conjunction with FIG. 3.

Thereafter, at step 416, fault detection device 108 performs machine learning techniques on the uniform time zone diagnostic log, the QoS metrics, and the event parameters for incremental learning and training. The event parameters and the QoS metrics are collected from a participant's point of view and the uniform time zone diagnostic log is generated from the point of view of video conferencing systems', for example, video conferencing system 102's, application design. As a result, performing machine learning techniques ensures that in future, video conferencing system 102 would be robust and reliable and would detect faults irrespective of associated severity and type (i.e., design level faults or user level faults.)

Based on the learnings derived by the machine learning techniques, fault detection device 108, at step 418, updates analytics rule database 212 with new analytics rule. This iterative updating of analytics rule database 212 ensures faster incremental learning for fault detection device 108 and reduces its dependency on data gathered from historical video conference sessions.

Figure 5:
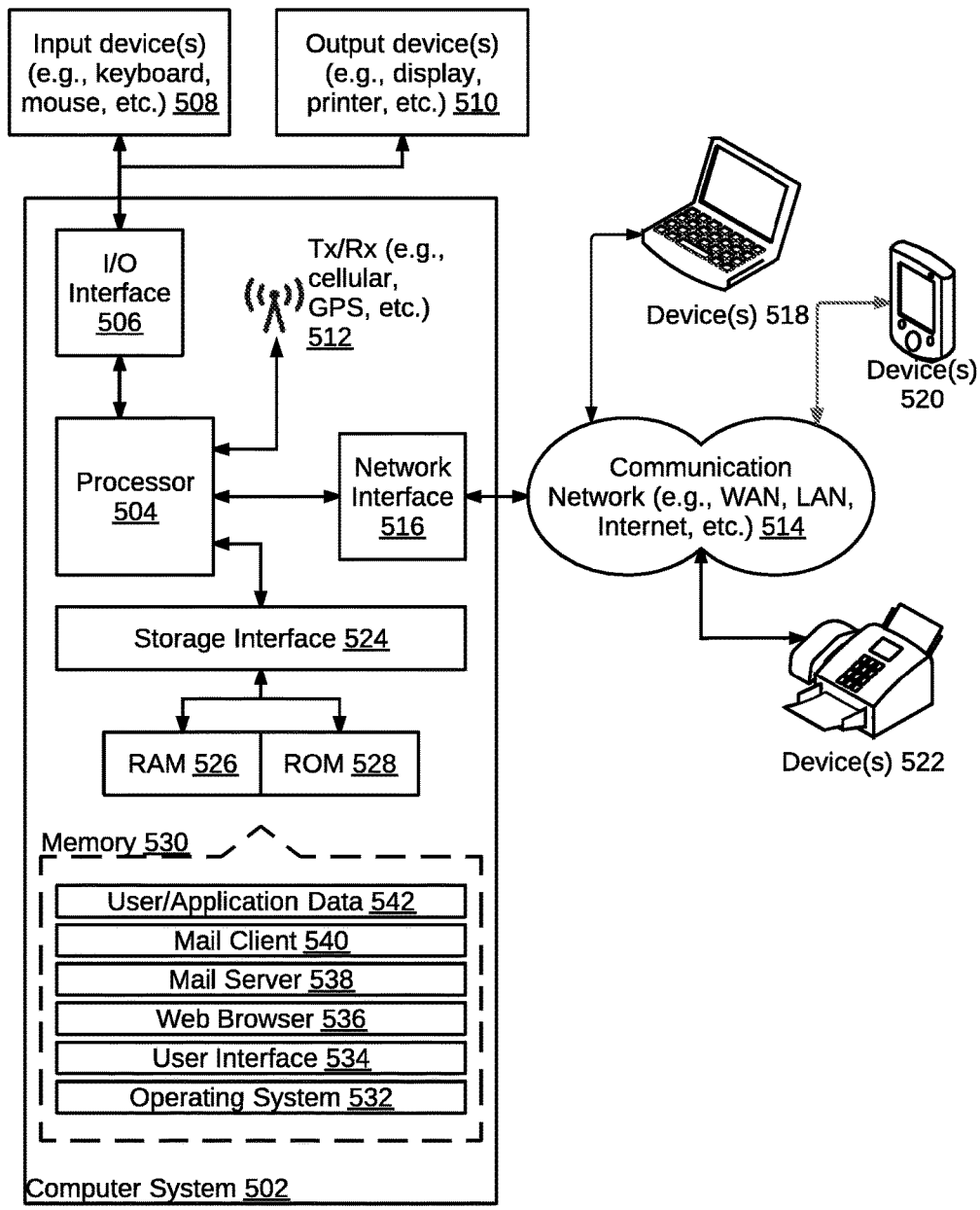
FIG. 5 illustrates a block diagram of an exemplary computer system for implementing various embodiments.

Referring to FIG. 5, a block diagram of an exemplary computer system 502 for implementing various embodiments is illustrated. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to the computer system 502, such as cursors, icons, check boxes, menus, scrollers, windows, widgets, etc. Graphical user interfaces (GUIs) may be employed, including, without limitation, Apple® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide a method and fault detection device for automatic fault detection and analysis in video conferencing systems. The method enables analysis of live video conference sessions to detect faults at participants' end reliably without failure. The method also identifies faults at system design level by analyzing diagnostic logs to detect issues that may not yet be visible but exist at system design level or may occur due to inconsistency in operating conditions. As machine learning techniques are used to identify newer situations that have not occurred historically, the device automatically develops incremental learning to improve fault detection in future. As a result, the fault detection device becomes more robust and reliable with time and is able to catch all faults irrespective of associated severity and type. The method also provides a dashboard that provides visual tools to access KPIs and determine an overview and status of the video conferencing system.

The specification has described method and fault detection device for automatic fault detection and analysis in video conferencing systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting and analyzing faults in video conferencing systems, the method comprising:
   extracting, by a fault detection device, a diagnostic log for at least one video conference session from a video conferencing system, wherein the diagnostic log comprises unstructured textual information;
   converting, by the fault detection device, the diagnostic log into a uniform time zone diagnostic log comprising structured textual information;
   collecting, by the fault detection device, Quality of Service (QoS) metrics associated with the at least one video conference session and event parameters associated with at least one live event within the at least one video conference session;
   processing, by the fault detection device, the uniform time zone diagnostic log, the QoS metrics, and the event parameters based on at least one of a plurality of analytics rules stored in an analytics rule database, wherein the plurality of analytics rules in the analytics rule database are created based on machine learning performed on the uniform time zone diagnostic log, the QoS metrics, and the event parameters; and
   performing, by the fault detection device, at least one predefined action based on a result of the processing.

2. The method of claim 1, wherein the diagnostic log is converted into the uniform time zone diagnostic log based on at least one of logging time of each participant, time zone of the video conferencing system, time zone of each participant, or relevant day light savings, and wherein the uniform time zone diagnostic log comprises a plurality of fields comprising at least one of a severity classification of error messages, time stamp of each error message, or actual verbose description of an error message or an event.

3. The method of claim 1, wherein the QoS metrics comprises at least one of a video QoS, an audio QoS, or a network QoS.

4. The method of claim 3, wherein the video QoS comprises at least one of frame rates, video freeze, or video blackouts, the audio QoS comprises at least one of audio bitrate, audio artifacts, or silence detection, and the network QoS comprises at least one of network bandwidth, packet latency, or packet loss.

5. The method of claim 1, wherein the event parameters comprise at least one of screen co-ordinates of a video freeze, a duration of the video freeze, a duration of an audio freeze, a duration of video quality deterioration, and a duration of audio quality deterioration.

6. The method of claim 1, wherein the at least one predefined action comprises at least one of: generating key performance indicators associated with the at least one video conference session, generating an alert or warning, or generating a summary report for the at least one video conference session, or sending a notification.

7. The method of claim 1 further comprising updating one or more analytics rules of the plurality of analytics rules stored in the analytics rule database in response to the performed machine learning.

8. The method of claim 1 further comprising creating the analytics rule database comprising the plurality of analytics rules based on analysis of at least one historical video conference session.

9. A fault detection device comprising:
   a processor; and
   a memory communicatively coupled to the processor, wherein the memory stores processor instructions, which, on execution, causes the processor to:
      extract a diagnostic log for at least one video conference session from a video conferencing system, wherein the diagnostic log comprises unstructured textual information;
      convert the diagnostic log into a uniform time zone diagnostic log comprising structured textual information;
      collect Quality of Service (QoS) metrics associated with the at least one video conference session and event parameters associated with at least one live event within the at least one video conference session;
      process the uniform time zone diagnostic log, the QoS metrics, and the event parameters based on at least one of a plurality of analytics rules stored in an analytics rule database, wherein the plurality of analytics rules in the analytics rule database are created based on machine learning performed on the uniform time zone diagnostic log, the QoS metrics, and the event parameters; and perform at least one predefined action based on a result of the processing.

10. The fault detection device of claim 9, wherein the diagnostic log is converted into the uniform time zone diagnostic log based on at least one of logging time of each participant, time zone of the video conferencing system, time zone of each participant, or relevant day light savings, and wherein the uniform time zone diagnostic log comprises a plurality of fields comprising at least one of a severity classification of error messages, time stamp of each error message, or actual verbose description of an error message or an event.

11. The fault detection device of claim 9, wherein the QoS metrics comprises at least one of a video QoS, an audio QoS, or a network QoS.

12. The fault detection device of claim 11, wherein the video QoS comprises at least one of frame rates, video freeze, or video blackouts, the audio QoS comprises at least one of audio bitrate, audio artifacts, or silence detection, and the network QoS comprises at least one of network bandwidth, packet latency, or packet loss.

13. The fault detection device of claim 9, wherein the event parameters comprise at least one of screen co-ordinates of the video freeze, a duration of the video freeze, a duration of an audio freeze, a duration of video quality deterioration, and a duration of audio quality deterioration.

14. The fault detection device of claim 9, wherein the at least one predefined action comprises at least one of: generating key performance indicators associated with the at least one video conference session, generating an alert or warning, or generating a summary report for the at least one video conference session, or sending a notification.

15. The fault detection device of claim 9, wherein the processor instructions further cause the processor to update one or more analytics rules of the plurality of analytics rules stored in the analytics rule database in response to the performed machine learning.

16. The fault detection device of claim 9, wherein the processor instructions further cause the processor to create the analytics rule database comprising the plurality of analytics rules based on analysis of at least one historical video conference session.

17. A non-transitory computer-readable storage medium having stored thereon, a set of computer-executable instructions causing a computer comprising one or more processors to perform steps comprising:

extracting, by a fault detection device, a diagnostic log for at least one video conference session from a video conferencing system, wherein the diagnostic log comprises unstructured textual information;

converting, by the fault detection device, the diagnostic log into a uniform time zone diagnostic log comprising structured textual information;

collecting, by the fault detection device, Quality of Service (QoS) metrics associated with the at least one video conference session and event parameters associated with at least one live event within the at least one video conference session;

processing, by the fault detection device, the uniform time zone diagnostic log, the QoS metrics, and the event parameters based on at least one of a plurality of analytics rules stored in an analytics rule database, wherein the plurality of analytics rules in the analytics rule database are created based on machine learning performed on the uniform time zone diagnostic log, the QoS metrics, and the event parameters; and performing, by the fault detection device, at least one predefined action based on a result of the processing.

* * * * *